Jan. 19, 1932.    F. M. REID    1,842,050
VEHICLE BRAKE
Filed Jan. 18, 1928    3 Sheets-Sheet 1
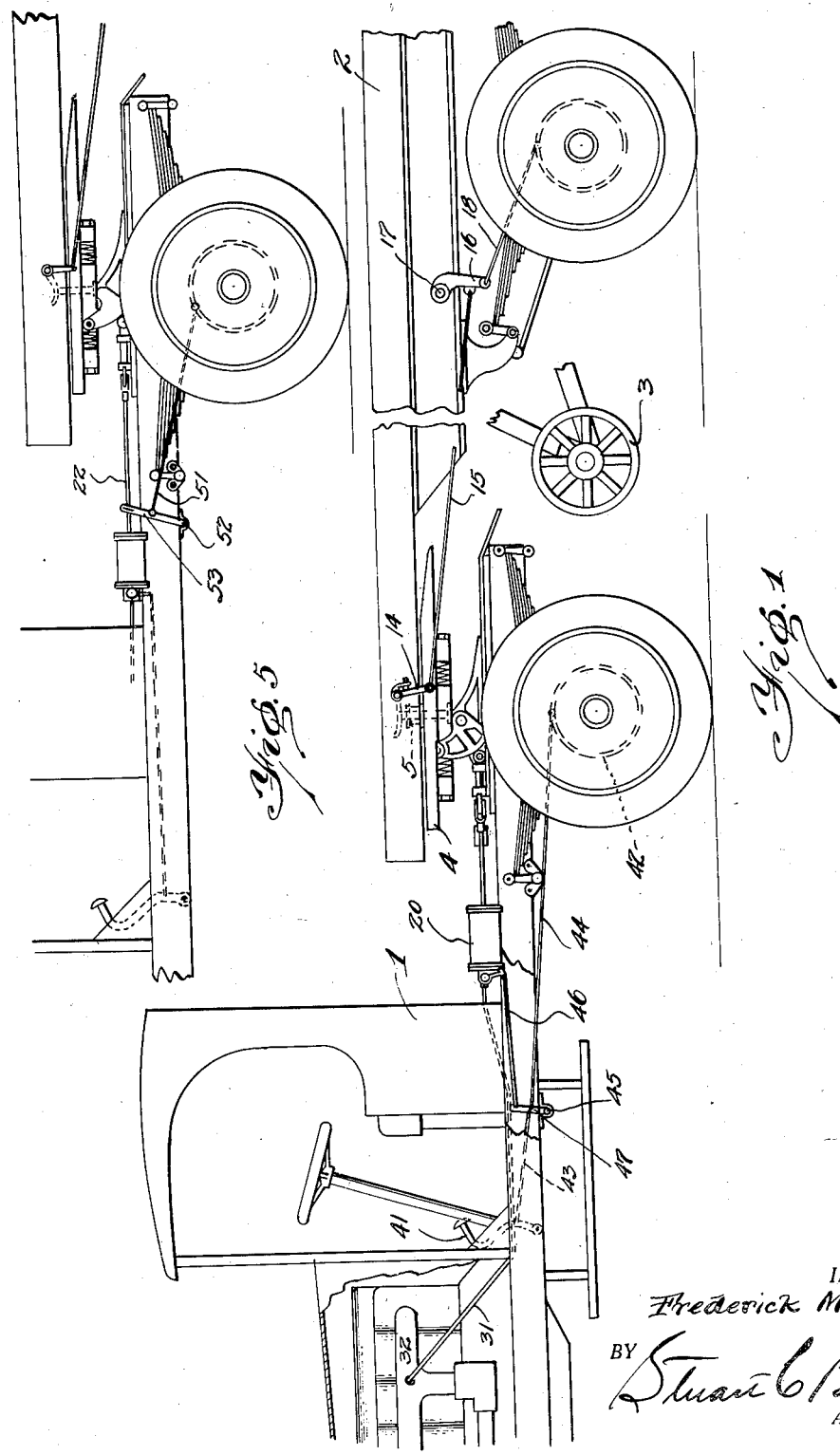
INVENTOR.
Frederick M. Reid
BY Stuart C Barnes
ATTORNEY.

Jan. 19, 1932.  F. M. REID  1,842,050
VEHICLE BRAKE
Filed Jan. 18, 1928  3 Sheets-Sheet 2
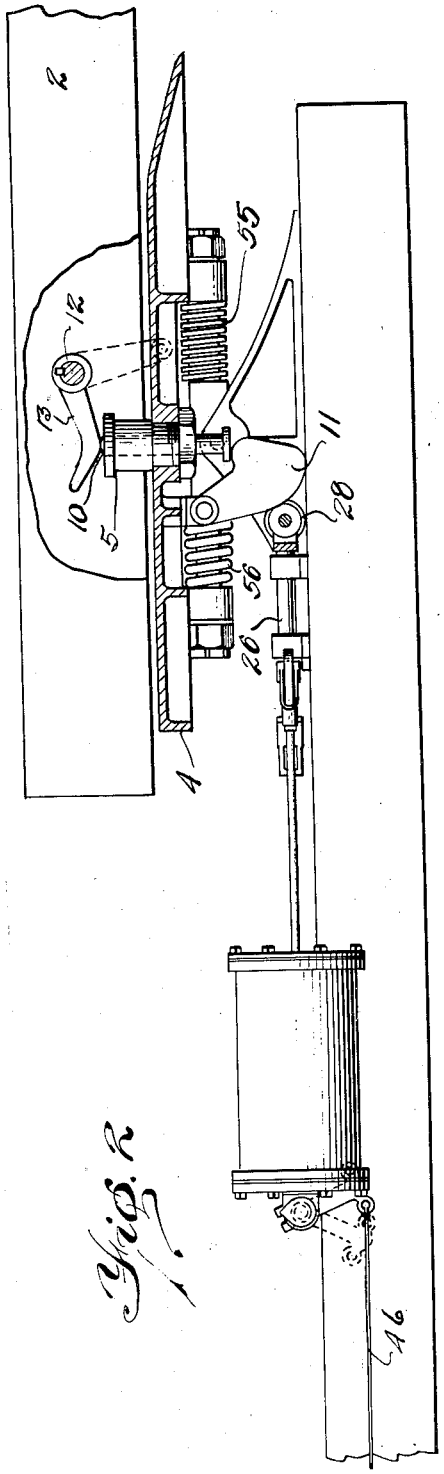
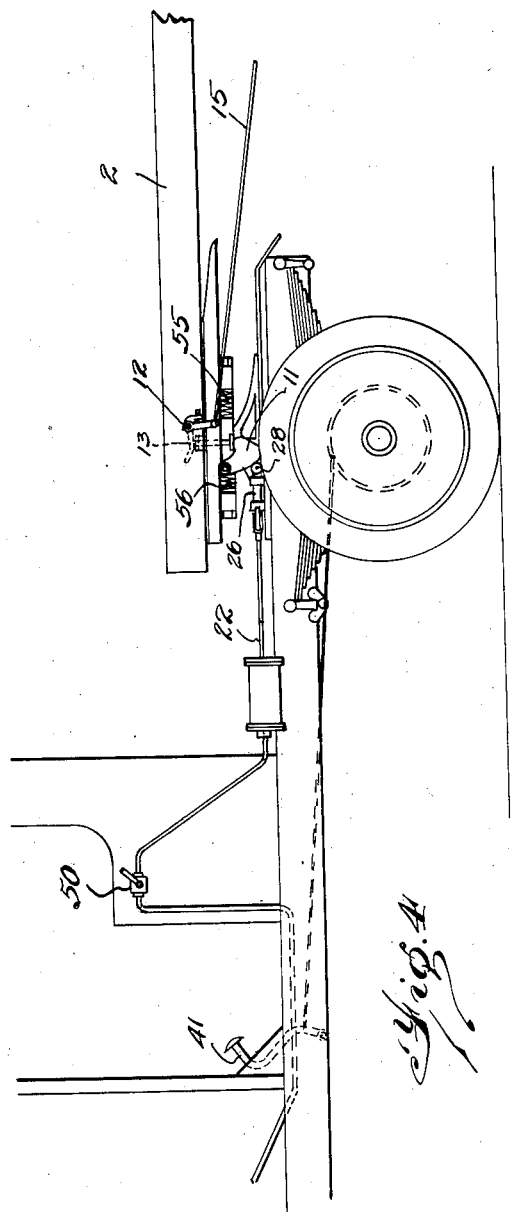
INVENTOR.
Frederick M. Reid
BY
Stuart C. Barnes
ATTORNEY.

Jan. 19, 1932.  F. M. REID  1,842,050
VEHICLE BRAKE
Filed Jan. 18, 1928   3 Sheets-Sheet 3
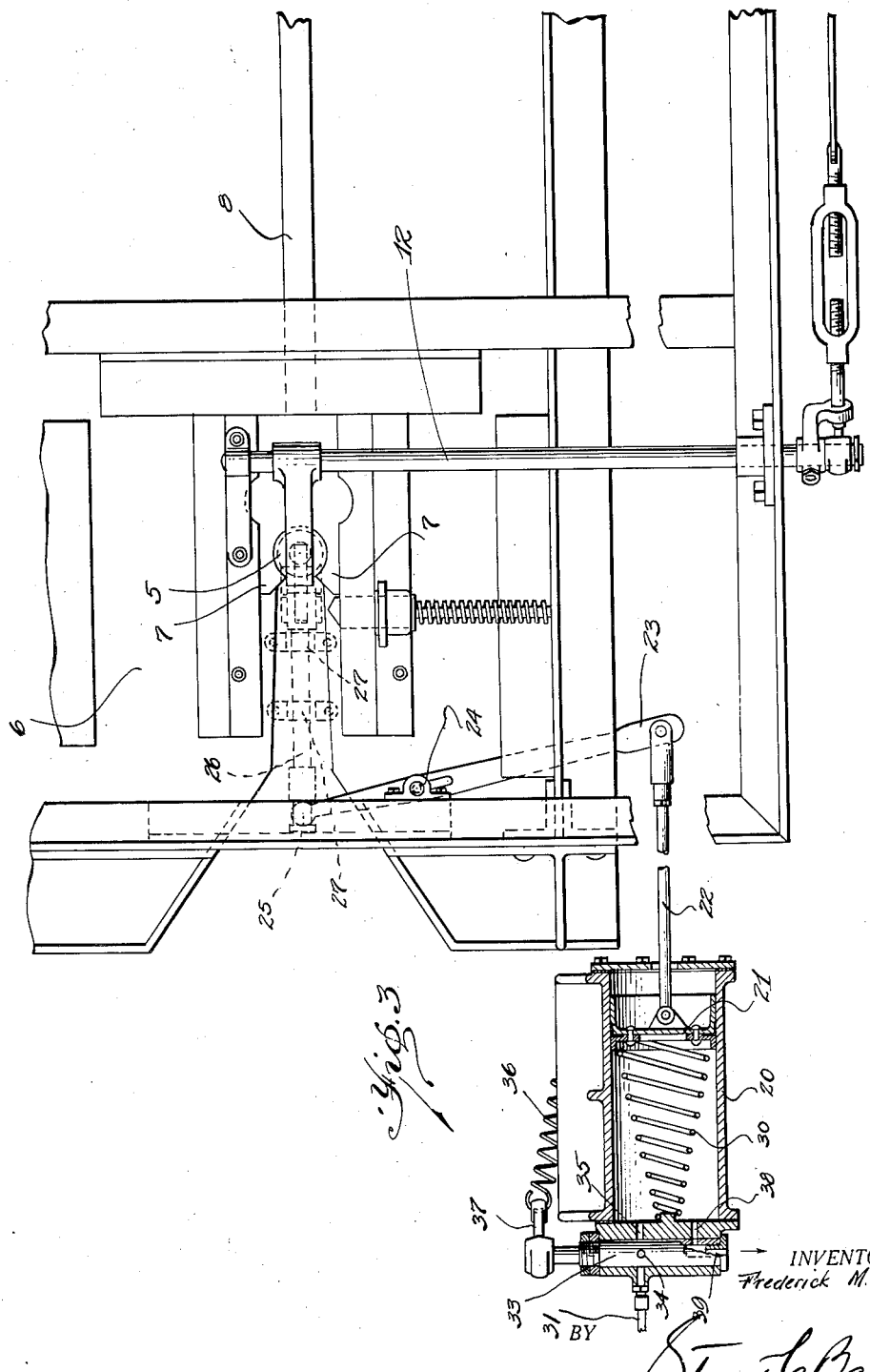
INVENTOR.
Frederick M. Reid
BY
ATTORNEY.

Patented Jan. 19, 1932

1,842,050

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

VEHICLE BRAKE

Application filed January 18, 1928. Serial No. 247,512.

This invention relates to vehicle brakes, and it has to do especially with mechanism for actuating the brakes of a semi-trailer attached to a truck or tractor.

A truck and semi-trailer forms in reality, a six wheeled vehicle jointed at the connection between the truck and semi-trailer, and it is desirable, especially when heavy loads are being carried, to have brakes applied to the trailer wheels as well as to the wheels of the truck. One manner of establishing an operable connection, so that an operator on the truck can apply the brakes on the trailer wheels, is shown in Patent No. 1,300,003, wherein an operable connection is provided through the king pin of the fifth wheel which connects the truck and trailer. The construction shown in this patent permits the tractor and trailer to be detachably connected.

The present invention aims to provide an improved brake operating mechanism useful for the application of the brakes on the trailer, and with this in mind the use of a mechanism which combines mechanical connections between the semi-trailer and the tractor similar to that of the above mentioned patent and a power actuating means, which is controlled by the operator is contemplated. This power means may advantageously be fluid operated. It has been proposed to actuate the brakes of a trailer by fluid pressure wherein a conduit connection is provided between the vehicles, but this is not the most satisfactory arrangement especially when the vehicles are adapted to be separated from time to time. It is also appreciated that it has been proposed to actuate brakes on a single vehicle by fluid pressure means. According to the present invention, however, mechanical means are provided at the point where the two vehicles are connected so that no difficulties are involved in connecting and disconnecting the vehicles, and in combination with this mechanical connection is a fluid actuating means permanently fixed to one vehicle. Thus a more powerful application of the brakes may be had than when manual operation alone is used, and also the fluid pressure means is not directly associated with the connection between the vehicles so that there is no interference with the operation of connecting or disconnecting them.

In the accompanying drawings:

Fig. 1 is a side elevational view of a tractor-trailer vehicle equipped with the brake construction in accordance with this invention.

Fig. 2 is a somewhat diagrammatical view with parts in section illustrating in more detail the manner in which the mechanism includes mechanical and fluid operated connections.

Fig. 3 is a plan view with some of the parts in section showing the fluid actuated mechanism and some of the mechanical connections associated with the fifth wheel.

Fig. 4 shows a modified arrangement wherein tractor brakes and trailer brakes are operable independently.

Fig. 5 is a view similar to Fig. 4, but illustrating how the brakes on both the tractor and trailer can be actuated by the fluid actuating means.

In Fig. 1 there is shown a tractor 1 attached to which is a semi-trailer 2, the two thus forming in effect a six-wheel vehicle. The trailer may be permanently secured or detachably secured to the tractor, and when detachably secured may be provided with a supporting construction 3 for supporting the frame of the trailer when detached. The connection between the tractor and trailer may consist of the usual fifth wheel construction, and the tractor being provided with a lower fifth wheel 4 having a king pin 5, and the trailer being provided with an upper fifth wheel 6 (Fig. 3) which includes locking members 7 which engage the king pin and lock the two vehicles together. The locking members may be of the reciprocating type which move during the operation of connecting or disconnecting of the vehicles, and this movement may be utilized for raising and lowering the support 3 by means of a draw bar 8 which is connected to the support. The construction thus far described pertains to tractor semi-trailer construction well known to those versed in the art, and the drawings depict an advantageous construction although, as far as the present invention is concerned, various other constructions can be used. As set forth above the tractor and semi-trailer may be either relatively permanently attached or connected for automatic engagement and disengagement inasmuch as the present invention is applicable to both forms, but it is particularly adaptable to the automotive type as will presently be brought out in full.

Referring to Fig. 2, it will be noted that the king pin is provided with an operating pin 10 which extends through the king pin. The lower fifth wheel of the tractor is provided with a pivoted pin operating member 11 which engages the lower end of this pin. The trailer 2 is equipped with a rock shaft 12 having keyed thereto a tongue 13 which engages the top of the pin 10 when the two vehicles are connected. As shown in Fig. 3, this rock shaft extends out to the side of the frame where it is provided with an arm 14 (Fig. 1) which is in turn connected to a brake actuating rod 15. This rod may be connected to an arm 16 on a rock shaft 17 which extends transversely of the vehicle. Rod 18 connects directly with the brake mechanism on the trailer wheel. A similar rod and arm (not shown) is provided at the other side of the vehicle for the other trailer wheel. This construction is such as to apply the brakes of the trailer when the pin 10 is raised within the king pin. As will readily be seen, this rocks the shaft 12 by reason of the pin engaging with the tongue 13, and this movement in turn acts through the several connections described to apply the brakes by a pull through the rod 18 connected directly to the brake.

For the purpose of controlling the actuation of the pin 10, there is provided a cylinder 20 (Fig. 3) permanently mounted upon the tractor. Within this cylinder is a piston 21 connected by rod 22 to a lever 23. This lever is pivoted as at 24, and preferably the lever is provided with an elongated slot at the pivot point to permit of a movement at this point so that the piston rod can operate in a straight reciprocating manner. The opposite end of the lever is connected, as at 25, with a reciprocable rod 26 which is guided by the devices 27, and the end of which may be provided with a roller 28 (Fig. 2) engaging the actuating member 11.

The end of the cylinder, out of which the piston rod 22 extends, is arranged to admit atmosphere to the cylinder, and back of the piston is preferably a coil spring 30 which may advantageously be conical in shape to permit its collapse. The opposite end of the cylinder is closed and provided with a suitable valve mechanism. A conduit 31 controlled by this valve leads to the intake manifold 32 of the engine, the engine employed being of the internal combustion type. This valve may be of any desired type but as herein shown consists of a rotatable plug member 33 provided with an opening 34 positioned in alignment with conduit 31 and port 35 in the cylinder head. A spring 36 is connected to an arm 37 on the valve to hold the valve in such normal position that the conduit 31 and port 35 are disconnected. In this position port 38 in the cylinder head connects into a passageway 39 which communicates to the atmosphere out of the end of the plug valve.

The controlling of the plug valve by an operator controls the actuation of the trailer brakes, and the control may be arranged so that the tractor brakes and the trailer brakes are applied at one time. As shown in Fig. 1, the usual foot lever 41 is connected to the brakes 42 on the tractor through rods 43 and 44, and arm 47 mounted on rock shaft 45. A suitable connecting device 46, such as a flexible cable, is connected to the arm 37 mounted on the plug valve 33.

It will be seen by this construction that when the driver of the vehicle depresses the foot lever 41, the tractor brakes are applied by the customary mechanical connections. At this time, the plug valve 33 is rotated so as to establish communication between the cylinder and the intake manifold of the engine. It will be understood that, due to the operation of the engine, a partial vacuum is set up in the cylinder. Inasmuch as the end of the cylinder opposite the connection with the intake of the manifold is exposed to the atmosphere, the piston 21 is moved from right to left (viewing Fig. 3). This actuates the lever 23, which forces the rod 26 from left to right (viewing Fig. 2). When this occurs the roller 28 engages the operating member 11 and swings it on its pivot, thus raising the pin 10. This causes a rocking of the shaft 12 by reason of the pin 10 engaging the tongue 13 and the application of the trailer brakes by the several connections above described. When the brakes are released, the spring 36 then turns the valve and closes the port 35 and allows atmosphere to enter the cylinder through the port 38. When the atmospheric pressure is equalized on both sides of the piston, the spring 30 returns the piston to a normal position thus releasing the trailer brakes.

This invention is especially advantageous because it affords application of brake pressure on the trailer wheels with sufficient power for effecting adequate braking action. It will be appreciated that when mechanical connections alone are used considerable of the applied power is lost through the numerous connections through the fifth wheel, etc. Considerable effort is therefore required of a driver. In the present construction, however, the power applied by the lever is merely sufficient to operate the tractor brakes at which time the fluid operating means operates the trailer brakes. Another advantage of the invention is that while fluid operating means are used for the trailer brakes, yet mechanical connections are utilized in the fifth wheel construction. This permits a tractor-trailer connection which is readily separable or connectible inasmuch as the separation takes place at the mechanical connections. Thus all the fluid operating mechanism may be permanently mounted upon the tractor, and there is no necessity of a conduit coupling between the two vehicles.

This construction permits the use of the present day automatic tractor-trailer combination wherein the two are connected or disconnected automatically without the necessity of the driver leaving his seat, whereas, when a conduit connection is established between the vehicles, manual operation is necessary, which not only requires the driver to leave his seat to make the connection, but results in a loss of time and renders the tractor and trailer combination non-automatic.

As shown in Fig. 4, the trailer brakes may be operated independently of the tractor brakes, and for this purpose a valve 50 may be provided near the driver's seat, which is operable to establish and release the conduit connection between the cylinder and intake manifold of the engine. It is within the invention to also connect the tractor brakes to the fluid operated cylinder of the mechanism so that the tractor brakes are also actuated by the fluid pressure means. For this purpose, as shown in Fig. 5, the tractor brakes may be connected to the piston rod 22, these connections being shown as consisting of brake rod 51, rock shaft 52 provided with lever 53 connected to the brake rod and piston rod. A similar rod 51 is to be used on the opposite side of the trailer for its other wheel. In this case the control valve can be operated either by the foot lever or a valve similar to the one, 50, shown in Fig. 4.

The construction of the fifth wheel, as here shown, and as it probably best appears in Fig. 2. is one which provides for the independent application of the trailer brakes when the trailer tends to override the truck, as for example, when the vehicle is going down an incline. Note that the lower fifth wheel, which is mounted on the truck, is carried between springs 55 and 56 which permit free movement of the lower fifth wheel relative to the truck body under the action of the springs. As the trailer overrides the truck and pushes the lower fifth wheel of the truck body, the member 11 is carried with it and engages the roller 28 whereupon the member 11 is cammed upwardly of its pivot when the trailer brakes are applied. However, the override feature per se is independent of the present invention and may or may not be used as desired.

I claim:

The combination with a tractor and a semi-trailer pivotally connected together, of brakes for the semi-trailer wheels, brakes for the tractor wheels, a brake lever, mechanical means connecting this lever with the brakes on the tractor wheels, mechanical means for operating the brakes on the trailer, including parts mounted on the trailer and parts mounted on the tractor, fluid pressure means situated on the tractor and controlled by the said brake lever, said fluid pressure means being operably associated with the said mechanical parts which are mounted on the tractor, for operating the trailer brakes, said tractor and semi-trailer being detachably connected and the brake operating means for the trailer wheels including rigid cooperating and separable parts.

In testimony whereof I affix my signature.

FREDERICK M. REID.